May 27, 1969          R. D. GRAYSON          3,446,227
FLUID CONTROL APPARATUS
Filed Feb. 6, 1964                    Sheet 1 of 4

INVENTOR.
RICHARD D. GRAYSON
BY Lyon & Lyon
ATTORNEYS

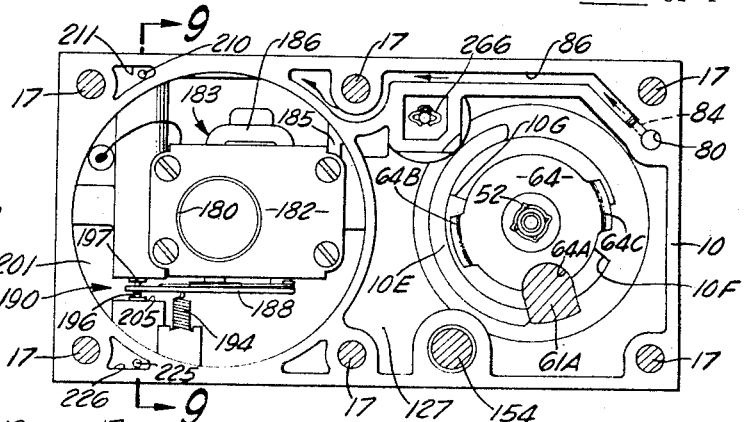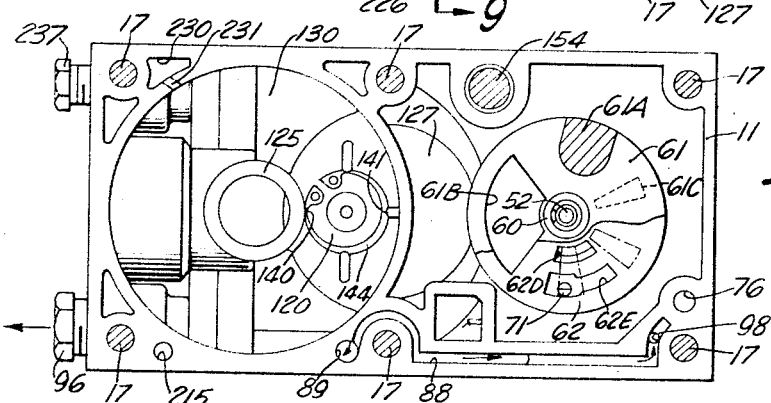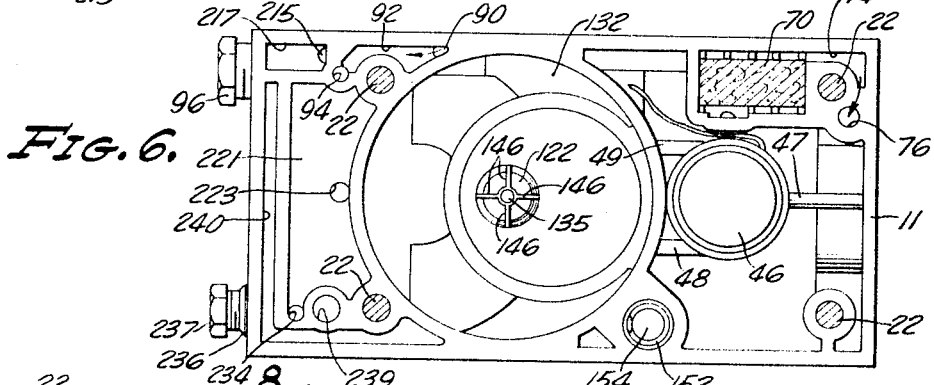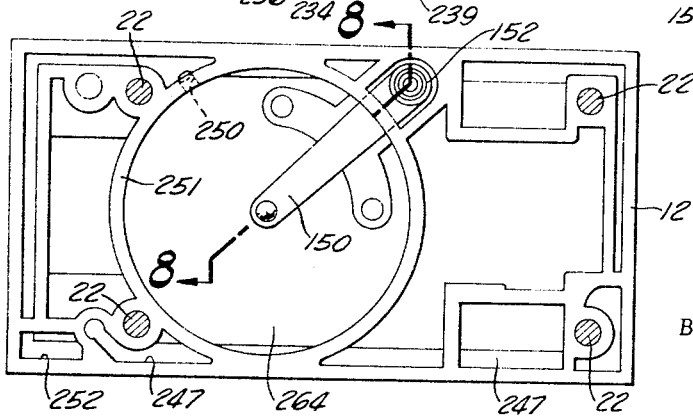

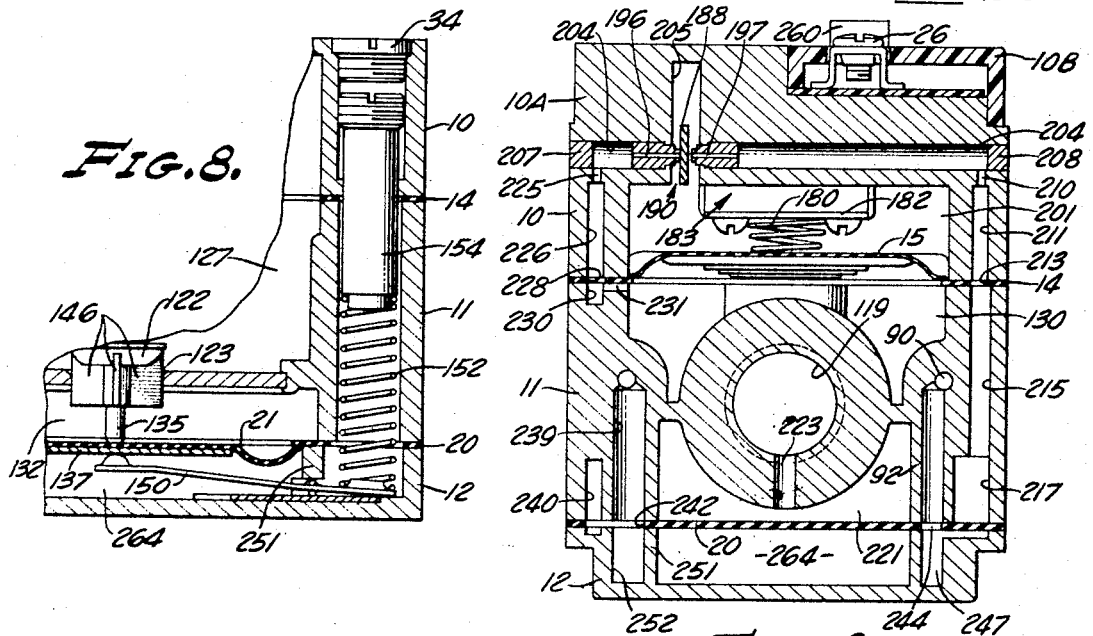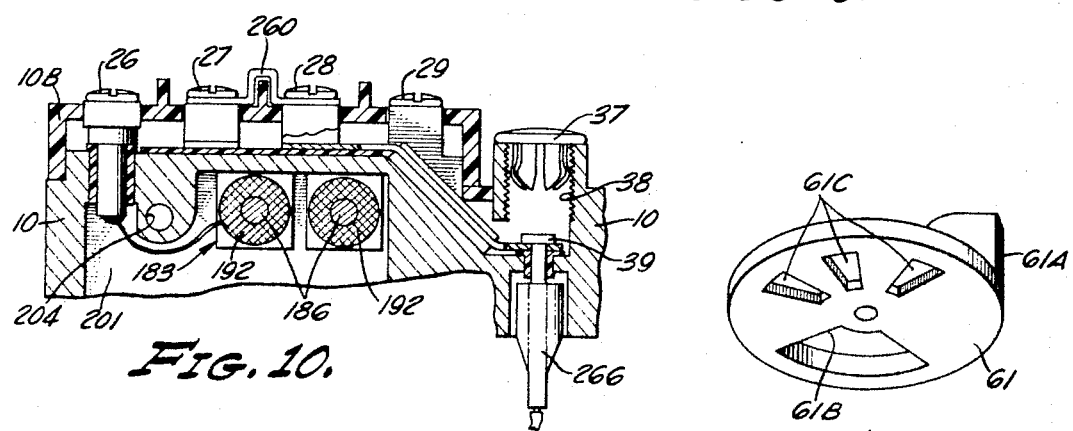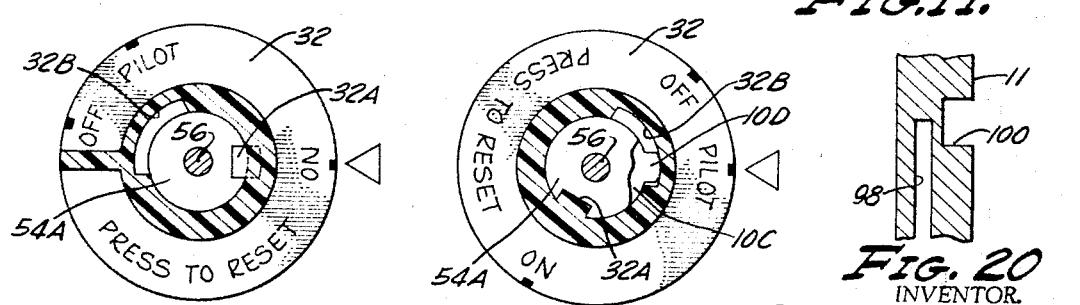

May 27, 1969   R. D. GRAYSON   3,446,227
FLUID CONTROL APPARATUS
Filed Feb. 6, 1964   Sheet 4 of 4

INVENTOR.
RICHARD D. GRAYSON
BY
Lyon & Lyon
ATTORNEYS

United States Patent Office 3,446,227
Patented May 27, 1969

3,446,227
FLUID CONTROL APPARATUS
Richard D. Grayson, Arcadia, Calif., assignor, by mesne assignments, to International Telephone and Telegraph Corporation, New York, N.Y., a corporation of Maryland
Filed Feb. 6, 1964, Ser. No. 343,056
Int. Cl. F23d 5/16, 13/26
U.S. Cl. 137—66                                    12 Claims This invention relates to control apparatus particularly useful in the control of fuel in a gas heating system.

The apparatus described herein is a combination heating control serving all of the necessary gas control functions for furnaces, space heaters and similar gas burning equipment. These functions include:

(1) An automatic pilot valve, thermocouple or pilot generator energized for shutting off all gas flow in case of pilot flame failure;

(2) Manual gas cock for manually controlling the flow of gas selectively to the main burner and pilot burner;

(3) A gas pressure regulator for regulating gas pressure supplied to a burner; and (4) An automatic valve usually electrically actuated through a thermostatically controlled circuit for controlling the flow of gas to a burner.

These functions are accomplished in a control characterized by:

(a) Its simplicity;
(b) Inexpensiveness;
(c) Compactness;
(d) Convenient and simple assembly both from the standpoint of initial manufacture and subsequent servicing using a minimum number of parts that cannot be inadvertently interchanged and result in malfunction;
(e) Safety with respect to gas leakage either under normal gas pressure or abnormally high gas pressure occasioned as, for example, by failure of a gas regulator in a gas line feeding the control.

It is therefore a general object of the present invention to achieve these aims.

The unique valve structure of the invention incorporates four different valves combined compactly into a single unitary casing. The casing has a fluid inlet, a main fluid outlet, and a pilot fluid outlet with flow paths extending through the casing and controlled by the various valves. These valves include a manually controlled valve for setting the condition desired such as off, on, or pilot gas flow; a safety valve controlled by a pilot burner flame and also placed into operation by the manually operated valve; a pressure regulator valve for regulating line pressure; and a main shut-off valve typically controlled by an external signal from a room thermostat for example.

Each of these valves are compactly formed within the casing in a manner to minimize manufacturing, assembly, and servicing operations. For example, the manually controlled valve seat and the main shut-off valve seat are coplanar with a surface which separates the casing into a main body section and a cover section with each of the casing sections being formed with various cavities defining the fluid path through the casing. As another feature, the gasket separating the main body section and the cover section is formed integral with a diaphragm forming a part of the main shut-off valve and the various openings are formed extending through the gasket to define portions of the fluid path. Additional features relate to the manually controlled valve and the safety valve being interconnected to prevent inadvertent unsafe operation of the control unit.

The use of a rotary slide valve in the present invention instead of a conventional tapered plug valve obviates many disadvantages found in prior art controls resulting largely from the fact that the stationary seal of the main valve, i.e. rotary slide valve, is now protected in the instant construction and cannot be deformed by an installer or service man in application of a fastening tool such as a wrench to the control.

Another feature of the construction is that the top cover member cooperates with a rectangular body member to which all pipe connections are made and that one side of such body member is closed by a bottom cover member which upon removal allows convenient access to a pilot gas filter and operating parts of a gas regulator.

A specific object of the present invention is to provide a control of this character in which all of the designated functions are housed within a small, compact envelope.

Another specific object of the present invention is to provide a control of this character which is relatively inexpensive and has versatility to allow its use in different types of heating systems.

Another specific object of the present invention is to provide a control of this character in which the number of parts and machine operations are reduced attendant with simplified assembly procedures.

Another specific object of the present invention is to provide a control of this character which is of small size but yet of high gas flow capacity, achieved in general by arranging components so as to utilize space efficiently with smooth and ample passageways for the main gas stream.

Another specific object of the present invention is to provide a control of this character in which those parts requiring manual access such as the control knob, electrical terminals, regulator and pilot adjustments are available at a single "dashboard" surface.

Another specific object of the present invention is to provide a control of this character which involves three die cast elements, mainly a top cover member, a body member, and a bottom cover member, each being generally of rectangular shape and each having adjacent ground or lapped sealing surfaces, with a flat gasket member incorporating a diaphragm clamped between the top cover member and the body member and a second flat gasket incorporating a diaphragm clamped between the body member and the bottom cover member.

Another specific object of the present invention is to provide a control of this character in which a gasket member has integrally formed therewith a diaphragm with a gasket member thus serving essentially two functions using a single unitary construction.

Another specific object of the present invention is to provide a control of this character in which the stator portion of a rotary slide valve, the stationary portion of a diaphragm operated valve and a sealing surface are all coplanar whereby a grinding or lapping process results in controlled coplanarity of these three surfaces and with precision at low cost.

Another specific object of the present invention is to provide a control of this character using a rotary slide valve operated by a knob which is required to be depressed in accomplishing a safe lighting feature.

Another specific object of the present invention is to provide a control of this character incorporating a diaphragm valve and a three way valve for controlling the pressure on the diaphragm, the three way valve incorporating a novel jet construction with two jets located precisely relative to a pivoted closure member, the present construction being featured by the fact that the jets are of a thin walled tubular form that provides sufficient resilience so that the jets may be pressed in place in slightly undersized aligned holes with the press fit serving to mechanically secure the jets precisely without additional parts.

Another specific object of the present invention is to provide a control of this character in which the gas from the vent jet of the diaphragm valve may be vented in various ways by choice of a particular sealing gasket. Using this technique, the vent gas may be directed to the main flow outlet passage, to the pilot flow outlet passage or to the atmosphere, depending upon particular aperturing of the gasket member. Thus, this choice is obtainable by simply changing the form of gasket and without changing constructional features of the die cast elements.

Another specific object of the present invention is to provide a control of this character in which the gas from the vent jet of the diaphragm valve has been directed to a distributing point at a gasket surface from which point the vent gas may be directed in any of three ways by simply slotting a gasket in a corresponding one of three ways.

Another specific object of the present invention is to provide a control of this character using a rotary slide valve with means incorporated therein for minimizing lifting force on the rotor portion of the slide valve in positions of the same between its off position and on position.

Another specific object of the present invention is to provide a control of this character in which the safety valve is mounted in a novel manner using a press fit.

Another specific object of the present invention is to provide a control of this character in which the outlet connection, pilot connection and vent connections are each located at the same end of the control.

Another specific object of the present invention is to provide a control, as specified in the preceding paragraph, in which the pilot connection may optionally be made at the other end of the control adjacent to the inlet connection.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1:
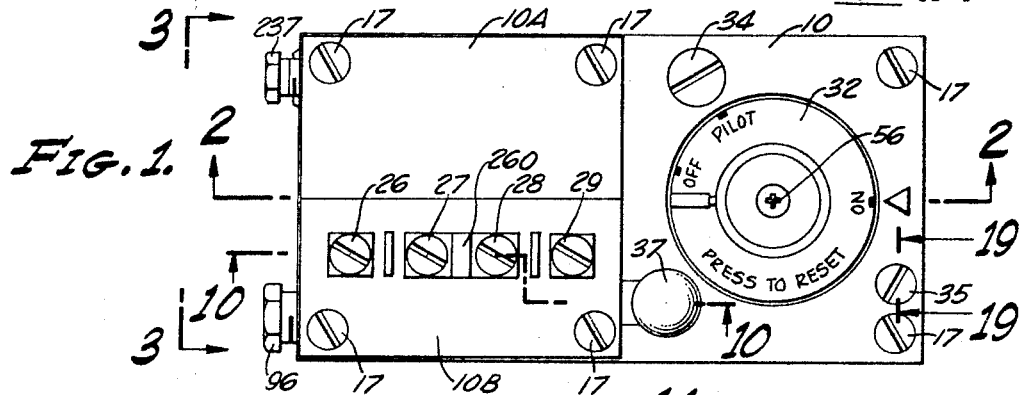
FIG. 1 is a top plan view of a control embodying features of the invention.
Figure 2:
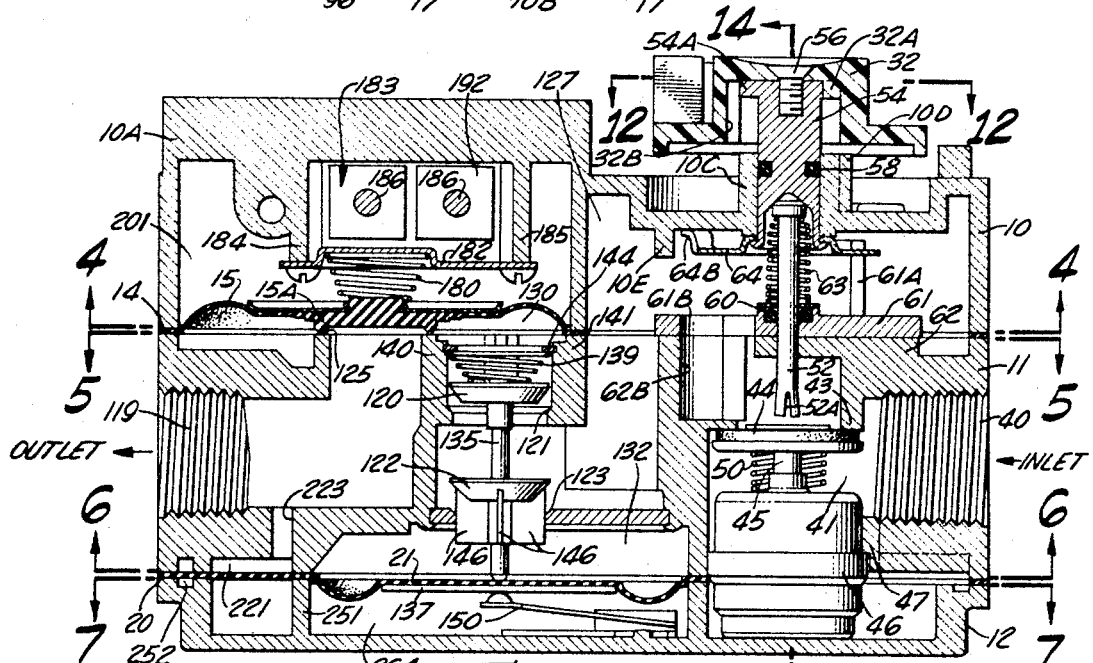
FIG. 2 is a sectional view taken substantially along the line 2—2 of FIG. 1.
Figures 3, 19:
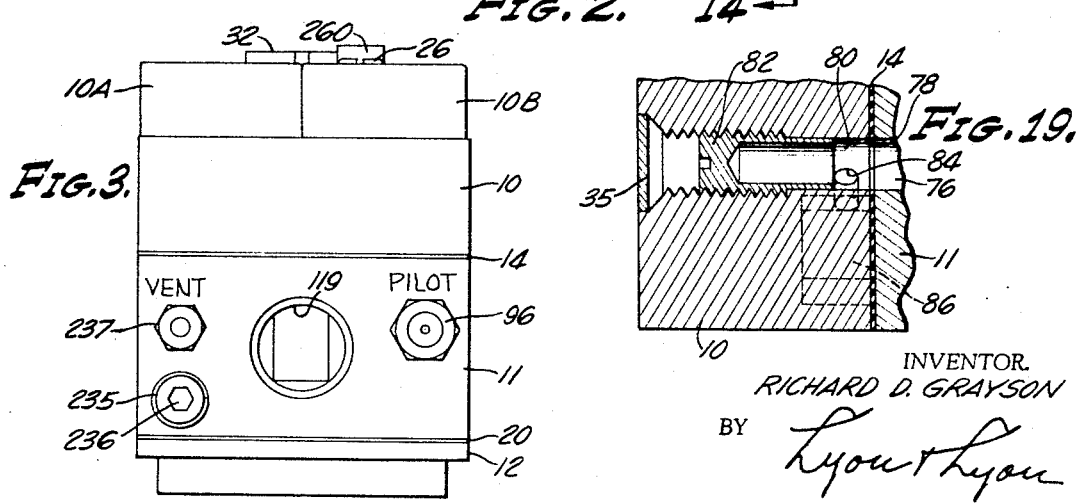
FIG. 3 is an end view of the control taken substantially in the direction indicated by the arrows 3—3 in FIG. 1.
Figure 14:
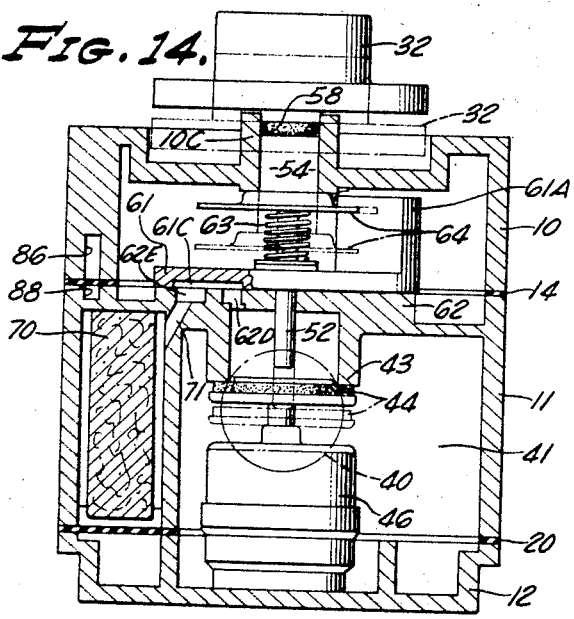
Figure 15:
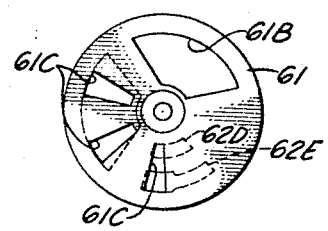
Figure 16:
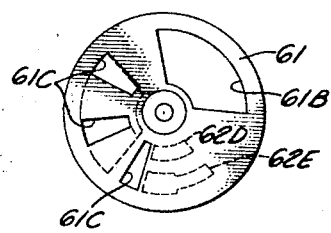
Figure 17:
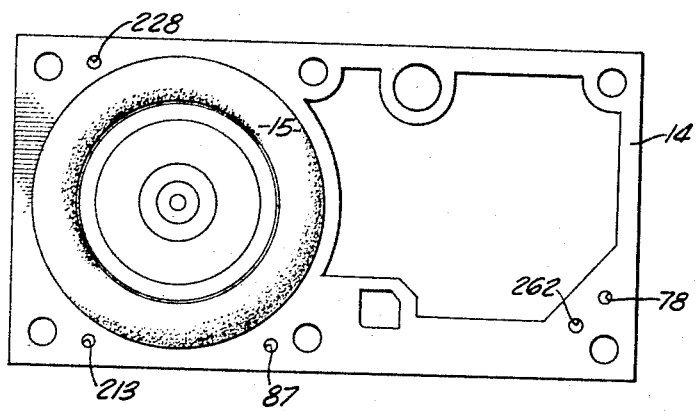
Figure 18:
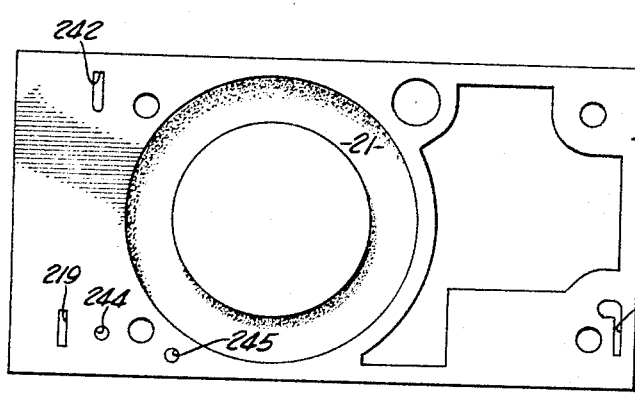

FIGS. 4, 5, 6 and 7 are views taken generally in the directions indicated by corresponding lines 4—4, 5—5, 6—6 and 7—7 in FIG. 2;

FIG. 8 is a view taken generally as indicated by the arrows 8—8 in FIG. 7 and serves to illustrate the regulator adjustment;

FIG. 9 is a view taken generally as indicated by the arrows 9—9 in FIG. 4;

FIG. 10 is a view taken generally as indicated by the lines 10—10 in FIG. 1;

FIG. 11 is a perspective view illustrating that surface of the rotor of the slide valve that engages the stator portion of the manually operated slide valve;

FIGS. 12 and 13 are views taken generally as indicated by the arrows 12—12 in FIG. 2, but with the control knob in different adjusted positions;

FIG. 14 is a view taken generally as indicated by the arrows 14—14 in FIG. 2;

FIGS. 15 and 16 illustrate relative positions of the rotor and stator of the manually operated valve with FIG. 15 corresponding to the pilot and reset position and FIG. 16 corresponding to the off position;

FIGS. 17 and 18 are plan views of the combined gasket and diaphragm members, FIG. 17 showing the upper gasket and diaphragm member and FIG. 18 showing the lower gasket and diaphragm member;

FIG. 19 illustrates details of the pilot flow adjustment and corresponds substantially to a view taken along lines 19—19 of FIG. 1; and FIG. 20 illustrates a construction which may be modified to provide an optional pilot burner connection.

The control involves three die cast elements, namely a top cover member 10, a center generally rectangular body member 11 and a bottom cover member 12. A special flat gasket member 14 having an integrally formed diaphragm 15 is maintained sandwiched between adjacent ground or lapped surfaces of the members 10 and 11 by six bolts 17 that releasably secure the top member 10 to the body member 11; and a special flat gasket member 20 having an integrally formed diaphragm 21 is maintained sandwiched between adjacent ground or lapped surfaces of the members 11 and 12 by four bolts 22.

The body member 11 and bottom cover member 12 are each generally rectangular as is also the top cover member 10 which, however, is formed with an upper rectangular housing portion 10A at one corner thereof adjacent to which a rectangular block of insulating material 10B is mounted for mounting of four screw type electrical binding posts 26, 27, 28 and 29.

The upper surface of the top cover member 10 includes not only the four binding posts 26, 27, 28 and 29, but also: the manual control knob 32; a plug screw 34 which when removed allows access to a gas regulator adjustment (described later); a plug screw 35 which when removed allows access to a pilot gas flow adjustment (described later); and a spring fingered closure member 37 which when removed allows access to an optional electrical connector 38, 39 that provides a connection for a coaxial type electrical connector (not shown). Thus, one feature of the present invention involves the placement and accessibility of adjustments, electrical connections and the manual control knob at the top side of the top cover member 10 for compactness, and minimization of installation space requirements.

The center body member 11 is provided with a threaded inlet opening 40 through which all gas flows into the gas inlet chamber 41, the gas being prevented from flowing further in the "OFF" position of the control by a safety valve having the annular stationary valve seat 43 and movable closure disc 44. This valve disc 44 is mounted on one end of an armature rod 45 which is slidably mounted in a cylindrical sheet metal casing 46 pressfitted within the region defined by three shouldered, equally spaced circumferential ribs 47, 48, 49 (FIG. 6) of the die cast housing member 11, these ribs being shouldered as shown with respect to the rib 47 in FIG. 2 with such shoulders serving to locate the casing 46 during the press-fitting operation.

A coil compression spring 50 acting between the casing 46 and the valve disc 44 urges it against its seat 43 to normally close the valve 43, 44 as shown in FIG. 2. The casing 46 contains a conventional electromagnet (not shown) which when energized produces insufficient magnetic force to attract and move its associated armature but does develop sufficient magnetic force when energized to maintain such armature in its attracted position once the armature is manually moved by means described later to and temporarily retained in its attracted position. In other words, the electromagnetically operated valve 43, 44 functions in conventional manner being energized with thermocouple current supplied by a thermocouple (not shown) in response to its heating by a flame at a pilot burner (not shown); and in the absence of a suitable pilot flame the spring 50 causes the valve 43, 44 to return to its closed position. Initially the valve 43, 44 is opened manually by force applied to an operating stem 52 in the manner described later involving a new operating mechanism which includes the knob 32 for that purpose.

The rotatable knob 32 as seen in FIG. 1 has three positions, namely, an "OFF," "PILOT" and an "ON" position, and may be pressed downwardly to open valve 43, 44 only when the knob is rotated to be in a position between the "OFF" and "PILOT" positions. For these purposes the knob 32 is retained in indexed relationship with a slidable and rotatable shaft 54 by a screw 56 with an internal lug 32A of the knob fitted into a notched portion in the flanged portion 54A of shaft 54. It will be seen that this shaft 54 is slidably mounted in a raised boss portion 10C of cover member 10 with a sealing O-ring 58 recessed in the shaft 54 and that such boss 10C has an integrally formed lug 10D extending radially outwardly therefrom which does not allow the knob 32 to be pressed inwardly in the "ON" position of the knob 32 shown in FIGS. 1 and 2. When, however, the knob 32 is rotated to a position between the "ON" and "PILOT" positions, an inner notched portion 32B of the knob is then adjacent the boss lug 10D allowing the knob 32 to be then pressed inwardly for purposes of opening valve 43, 44 and moving the armature (not shown) attached to shaft 45 into magnetic cooperation with the electromagnet in casing 46, the force for opening of the valve being transmitted through shaft 54 and stem 52 which has an enlarged head portion engaging a recessed portion of stem 54 and which passes in turn through aligned apertured portions in: an O-ring seal 60 recessed within a rotor valve element 61; an apertured portion in rotor 61; and an apertured portion in the cooperating stator portion 62. A coil compression spring 63 around pin 52 has one of its ends bearing against the enlarged head portion of pin or stem 52 and the other one of its ends bearing on the rotor valve element 61 to urge the shaft 54 and knob 32 attached thereto upwardly or outwardly. For convenience in assembly one end of pin 52 is bifurcated at 52A to provide spring retaining fingers that are sufficiently resilient to allow the pin to be pressed, in assembly through the above mentioned aligned apertured portions to provide also an axle about which the rotor valve element 61 may be rotated.

The valve rotor 61 is coupled to the shaft 54 using the following construction. A sheet metal disc 64 is secured, as, for example, by staking or riveting to one end of shaft 54 and has a notched portion 64A (FIG. 4) engageable with an integrally formed raised lug 61A on rotor 61, the lug 61A being raised sufficiently to maintain continuous engagement with such notched portion 64A in all positions of the knob 32.

To limit rotational movement of the knob 32 only between that region between the "OFF" and "ON" positions which includes the "PILOT" position, there is provided a raised arcuate bead portion 10E (FIGS. 2 and 4) on casing member 10, the opposite ends of which engage and act as a stop member for the rotor lug 61A in the "ON" and "OFF" positions.

It is desirable for an operator in operation of the heating equipment to change the setting of the control from an "ON" condition to a "PILOT" condition as, for example, when he services the equipment and this is done by rotating the knob from the "ON" position to the "PILOT" position and in such manipulation means are provided to prevent inadvertent travel of the knob past the "PILOT" position to the "OFF" position. Such means involves a pair of raised abutments 10F, 10G (FIG. 4) located 180 degrees apart on the underside of housing member which engage and serve as stop members for the pair of ears 64B, 64C on the sheet metal disc 64. In order to move these ears past these abutments, some downward or inward pressure must be applied to the knob to overcome the force of spring 63 at which time the knob 32 may be rotated from the "PILOT" position towards the "OFF" position, if so desired when complete shutdown of the system is desired.

In the "PILOT" position, gas may flow only to a pilot burner and in the "OFF" position, gas is prevented from flowing to the pilot burner in which case there is no pilot flame, the associated thermocouple is no longer heated and the electromagnetically maintained valve 43, 44 is then allowed to close under the influence of spring 50 to thereby shut off gas to the system. Thus, by providing such stop members 10F, 10G, there is no inadvertent shutting down of the complete system, i.e. extinguishment of the pilot flame, but this is accomplished only by applying both torque and an inwardly directed force simultaneously on knob 32 for rotation of the knob to the "OFF" position.

It will be seen that the rotor 61 has a segmental opening 61B (FIG. 11) therethrough which is in registry with the like opening 62B in stator portion 62 in the "ON" position of knob 32; and that such rotor 61 has a series of three spaced shallow grooved portions 61C, also segment shaped, serving in succession, during rotation of rotor 61 to place pilot gas opening 62D (FIG. 5) in stator 62 in communication with a grooved portion 62E in such stator 62, such grooved portion being in communication with a pilot gas filter housing 70 (FIG. 14) via a drilled hole 71 forming the inlet to the filter housing 70. Pilot gas may thus flow to the filter housing 70 (and to the pilot burner, not shown) in all positions of knob 32 except in its "OFF" position as indicated in FIGS. 15 and 16. The reason for providing three separate small pilot gas grooves 61C in the rotor 61 instead of one large groove is based on the consideration that the pressure of the gas acts to tend to lift the rotor 61 from its mating stator 62 and the total force tending to produce such lift is reduced by reducing the area on which the gas pressure operates. Thus, at any one time (between "PILOT" and "ON" positions), the surface provided by not more than two small grooves 61C defines the effective area instead of one large groove that would otherwise have to encompass all three grooves 61C and thereby the force tending to unseat the rotor is minimized and a lighter spring 63 may be provided to in turn reduce wear on the mating rotor and stator surfaces.

The flow of pilot gas from the outlet of filter housing 70 is now described under the assumed condition that the knob 32 is in its "PILOT" position and valve 43, 44 has been reset such that valve 43, 44 is now maintained in its open position by thermocouple current developed by burning pilot gas.

Gas from the outlet of filter housing 70 flows through a shallow grooved portion 74 in casing member 11 (FIG. 6), such grooved portion 74 being partially covered by gasket member 20 (FIG. 18) which has a slotted portion 75 therethrough serving to intercommunicate the grooved portion 74 with a bore hole 76 in casing member 11. Hole 76 extends through the center casing member 11 and communicates via the apertured portion 78 in upper gasket 14 with one end of a bore 80 in top cover member 10, the other end of bore 80 being closed by a pilot gas metering valve element 82 which adjustably controls the flow of pilot gas to a branch bore hole 84 that communicates with one end of the slotted portion or manifold 86 in casing member 10, this slotted portion 86 being in communication via an apertured portion 87 in gasket 14 with a slotted portion 88 in center casing member 11, this slotted portion 88 being in communication with a vertical bore hole 89 (FIG. 5) which is intersected by an angled bore hole 90 (FIG. 6). This angled hole or passageway 90 thus introduces pilot gas to a grooved portion 92 from where it flows via vertical bore hole 94 to a threaded pilot burner connector 96. In those instances where it is desirable to have the pilot burner connector on the right hand end of the unit (FIG. 1) adjacent the gas inlet opening instead of adjacent the main gas outlet as described above, such right hand end may optionally be provided with a tapped hole (not shown) for a pilot burner connection with such tapped hole being in communication with the auxiliary vertical bore 98 which is in communication with the slotted portion 88 where filtered and metered pilot gas is present. Provisions for this optional pilot burner connection may be made in die casting the casting 11, as shown in FIG. 20, wherein for achieving this purpose the blind hole 100 is extended so that it then communicates with bore hole 98 with such hole 100 then being tapped to receive a fitting. Also this may be done in which case the tapped hole may then be fitted with a plug when, as described above, the pilot gas outlet is adjacent, i.e. on the same side as the main gas outlet.

Main burner gas flow

For the main gas flow from the inlet opening 40 to the outlet opening 119 it is necessary that three valves be open. These valves are, in the order of gas flow: the electromagnetically maintained safety valve 43, 44; the manual valve 61, 62 open in the "ON" position of knob 32; a semi-balanced gas pressure regulator valve comprising the jointly movable valve elements 120, 122 cooperating respectively with seats 121, 123 (such regulator valve always being open in different amounts); and a pilot operated diaphragm valve comprising diaphragm 15 and its co-operating valve seat 125. More specifically the gas in inlet chamber 41, under the above conditions, flows through the valve 43, 44 and through the then aligned stator openings 62B and rotor opening 61B into the chamber 127. From chamber 127 the main gas flow takes two parallel paths, one of which extends through the regulator valve section 120, 121 to a chamber 130 and the other one of which extends through the other regulator valve section 122, 123 to the chamber 132 above the regulator diaphragm 21, this chamber 132 being in free communication with chamber 130 so that these two parallel paths merge into the same chamber 130. It is noted that chamber 130 is defined essentially by that annular portion of diaphragm 15 which is between its clamped peripherical portion and its annular raised portion 15A which engages the seat 125 in the closed position of valve 15, 125. When this valve 15, 125 is open, as assumed, the gas flow is from chamber 130 via valve 15, 125 to the outlet opening 119.

Gas pressure regulating valve

The gas pressure regulator valve comprising the two sections 120, 121 and 122, 123 is on the downstream side of the manually operated disc valve 61, 62 and on the upstream side of pilot operated valve 15, 125, and its function is to automatically regulate the gas pressure to a substantially constant gas pressure at the outlet opening 119 when the pilot operated valve 15, 125 is open.

For this purpose, a pair of tapered valve discs 120, 122 are joined by a shaft 135 which is extended to engage the central portion of diaphragm 21 backed by a steel disc 137. A coil compression spring 139 has one of its ends seated on valve disc 120 and the other one of its ends retained by shouldered portions of ribs 140, 141 with such other end of the spring 139 engaging such shouldered portions directly or as shown with an intermediate washer 144 engaging such shouldered portions so that the two valve discs 120, 122 are urged constantly towards their corresponding seats 121, 123 by spring 139. For guiding the movement of these valve discs, there are provided four fin portions 146 in the form of plates on the downstream side of valve disc 122 with the ends of such four fin portions 146 cooperating with the annular opening defining the seat 123. It will be seen that the valve discs 120, 122 are moved in accordance with gas pressure acting on the top side of diaphragm 21 (FIG. 2) with the valves 120, 121 and 122, 123 being moved closer to valve closing position the greater the pressure in chamber 132 or chamber 130 whereby such valves produce a throttling action to automatically maintain a substantially constant outlet pressure when valve 15, 125 is open.

That pressure maintained substantially constant may be adjusted manually using the following structure. A lever 150 (FIGS. 2 and 8) pivoted at a point intermediate its ends, has one of its ends bearing against a central portion of steel backing disc 137 and the other one of its ends formed as a seat for one end of coil compression spring 152 which has its other end bearing against an adjustable screw threaded plug 154, such plug being accessible for adjustment upon removal of the screw threaded plug 34. The spring 152 is heavier than spring 139, the spring 139 being a light spring which assures contact of the end of shaft 135 with diaphragm 21 and the adjusted force establishing the value of regulated pressure since the deflection of diaphragm 21 and the setting of valves 120, 121 and 122, 123 is established essentially by gas pressure and spring 152.

Pilot operated valve

The pilot operated diaphragm valve 15, 125 is a normally closed valve and requires an input signal to effect its opening. Briefly, the valve 15, 125 is maintained closed by both sides of its diaphragm 15 being subjected to the same gas inlet pressure and when it is desired to open the valve, one side only is subjected to inlet gas pressure so that such inlet pressure effects an opening of the vlave 15, 125, the other side of the diaphragm for this latter purpose being suitably vented to achieve a differential pressure for producing movement of the diaphragm to its valve opening position.

The diaphragm 15 is urged toward its seat 125 by a light spring 180 acting together with the inherent resiliency of the diaphragm 15. The spring 180 has one of its ends bearing on the diaphragm 15 with a protuberance of the diaphragm extending upwardly into the spring 180 to retain such spring, the other end of the spring 180 bearing against a recessed portion of a plate 182 which forms a housing for an electromagnet 183, such plate 182 having extended portions which are secured by screws to rib members 184, 185 of cover member 10.

The electromagnet 183 is considered of conventional construction and involves a U-shaped stationary core member 186 (FIG. 4) having its two ends cooperating magnetically with a pivoted armature 188 that constitutes an element of a three-way valve 190. A winding 192 is wound around core member 186. As seen in FIG. 4, this element 188 is pivoted near one of its ends on a pole piece defined by one end of U-shaped core 186 and is urged upwardly in a clockwise direction by a coil spring 194 that normally causes the end of element 188 to close one of the valve ports 197 and to allow the other aligned valve port 196 to be open (FIG. 9). Upon energization of the electromagnet, i.e. coil 192, the element 188 pivots in a counterclockwise direction in FIG. 4 against the action of spring 194 to open the port 197 and to close the port 196. In the normal position, i.e. the deenergized condition of the electromagnet, the space 130 is in communication with the chamber 201 so that fuel inlet pressure in the chamber 201 acts on the top side of diaphragm 15 (FIG. 2) to more than equalize the pressure on the bottom side of diaphragm 15 whereby gas inlet pressure maintains the valve 15, 125 closed. The gas passageways for accomplishing this are described later.

When it is desired to open the valve 15, 125, the electromagnet coil 192 is energized to thereby cause the port 196 to be closed and the vent port 197 to be opened. The port 197, now open, serves to vent the chamber 201 so that the chamber 201 assumes a pressure lower than the inlet gas pressure, i.e. a differential force is developed on the diaphragm 15 causing it to raise in FIG. 2 to open valve 15, 125. The gas passageways for accomplishing this are described later.

An important feature of the present construction involves the accurate placement and securing of the two ports 196, 197, this construction being perhaps more clearly illustrated in FIG 9 wherein the two ports are disposed within a bore hole 204 extending through the casing member 10. This bore hole is interrupted by a slotted portion 205 through which the flapper valve element 188 extends and is movable. The two ports 196, 197 are press fitted in the bore 104 with shouldered portions thereof engaging internal shouldered portions in the bore 204 with such shoulder portions thereby accurately locating the ports; and because of the press fit the parts are secured against movement. After assembly, as indicated, the ends of the bore holes are closed by plugs 207 and 208.

For these purposes the port 196 is in communication with gas pressure and port 197 is suitably vented. Port 197 is illustrated as being in communication with the outlet opening 119, for the main burner and this opening is, of course, at atmospheric pressure or sub gas pressure when no gas is being supplied thereto or during the initial phase of gas flow to the main burner so that the outlet opening 119 is a suitable vent for these purposes. Specifically port 197 is vented to the outlet opening 119 through the following path which includes, in turn, the bore 204, the restricted passageway 210 (FIG. 9), cavity 211, apertured portion 213 in gasket 14, the bore 215 in casing 11 which terminates in a recessed cavity 217, this cavity 217 being in communication via the rectangular slotted portion 219 (FIG. 18) in gasket 20 with the chamber 221; and chamber 221 is in communication with opening 119 via bore hole 223.

The other port 196 is in communication with chamber 130 through a path which, in turn, includes the following: bore 204, restricted passageway 225, cavity 226, apertured portion 228 in gasket 14, cavity 230 and a slotted portion 231.

It is noted that the chamber 221 is also in communication with a bore hole 234 (FIG. 6) to place the same in communication with an auxiliary tapped opening 235 (FIG. 3) which is illustrated as being closed by plug 236 for use in those instances where it is desired to bleed off gas at the time gas is being supplied to the main burner as, for example, to a pilot burner.

A vent outlet 237 is illustrated as being in communication with a bore 239 (FIG. 6) which is communicated with the cavity portion 240 via the rectangular slotted portion 242 (FIG. 18) in lower gasket 20. This cavity portion 240 provides an optional venting connection and is used in those instances when it is desired to vent the three-way valve to the outlet 237 instead of, for example, to the main burner, and this is achieved simply by providing a different apertured portion in lower gasket 20 for the apertured portion 219 so that instead of such apertured portion communicating cavity 217 with cavity 221 the substituted apertured portion intercommunicates the cavity 217 with cavity 240.

Also it will be noted that two apertured portions 244, 245 (FIG. 18) are provided in the lower gasket 20 to intercommunicate the pilot gas cavity 92 (FIG. 6) with the cavity portion 247 (FIG. 7) in the lower cover member 12 and that such cavity portion 247 may communicate via gasket apertured portion 75 (FIG. 18) with the downstream side of pilot gas filter housing 70, as previously described, to obtain a main or supplemental pilot gas flow which is not controlled by the adjustable valve 82 (FIG. 19).

It is also noted that the upper gasket member 14 has an apertured portion 262 (FIG. 17) that serves to communicate the cavity portions 88 (FIG. 5) and 86 (FIG. 4), and thus provides a pilot gas flow path in parallel with the path through gasket apertured portion 87.

Thus it will be seen that by providing cavity portions in mating surfaces of the die cast elements and by providing a gasket between such mating surfaces, the gasket may be conveniently apertured at desired locations to selectively intercommunicate cavity portions in adjacent faces of the die cast elements to achieve a variety of arrangements without performing any machining operations on the die cast elements. This is made advantageous by disposing the four cavities, namely the diaphragm valve vent cavity 217, the pilot gas cavity 92, the vent cavity 240 and the main outlet cavity 221 adjacent each other so that by a small suitable apertured portion of gasket 20 the diaphragm valve may be vented in either of three ways, namely to the main outlet via apertured portion 219 (FIG. 18) as specifically described herein or to the pilot burner or to the atmosphere. In the latter two instances correspondingly the cavity 217 is communicated with cavity 92 and the cavity 217 is communicated with cavity 240.

The bottom side of the pressure regulator diaphragm 21 defines one wall of a chamber 264 (FIG. 2 and 7) which is vented to the atmosphere via a bore 250 (FIG. 7) in the circular rib 251, the bore 250 communicating with the cavity portion 252 which in turn communicates with the vent port 239 and vent connection 237 via the gasket aperture portion 242 (FIG. 18).

The terminals 26, 27 provides binding posts for connection to the diaphragm valve coil 192, and the other two terminals 28, 29 provide binding posts for the electromagnet of safety valve 46. Terminals 27 and 28 may be interconnected by a removable jumper electrical connection 260 (FIG. 1). For versatility of connections, the binding post 28 as seen in FIG. 10 is connected to the insulated contact 35 adapted to be engaged by an insulated conductor of a cable (not shown) having an outer sheath electrically connected to the metal casting 11 through a screw-threaded connection that includes the threaded portion 38.

One terminal of the electromagnet may be grounded to the die cast case leaving one terminal connectable through a slip connector 266 which provides a readily attachable and detachable connection allowing disassembly and assembly of the device.

While the particular embodiments of the present invention have been shown and described, it will be obvious to those skilled in the art that changes and modifications may be made without departing from this invention in its broader aspect and, therefore, the aim in the appended claims is to cover all such changes and modifications as fall within the true spirit and scope of this invention.

I claim:

1. In a control of the character described, a casing having a gas inlet, a main gas outlet and a pilot gas outlet; a valve structure controlling gas flow from said inlet to said outlets; and said valve structure including: a flat apertured valve seat in communication with said inlet; a flat rotatable valve element on said seat and incorporating means, in a first position thereof, for preventing gas flow to said outlets and incorporating means, in a second position thereof, to communicate said inlets to said pilot gas outlet and incorporating means, in a third position thereof, to communicate said inlet to said main gas outlet; knob means mounted on said casing for both rotatable and axial movement thereon; first resilient means acting between said valve element and said knob means to normally urge said knob means outwardly of said casing and to urge said valve element against said seat; a rod extending through said flat valve element and said flat valve seat forming an axle about which said flat valve element is rotatable, one end of said rod engaging said knob and forming a seat for said first resilient means and the other end of said rod being enlarged to prevent the rod from being withdrawn through said flat valve seat; an electromagnetically maintainable safety valve comprising: an electromagnetic structure mounted on said casing; a safety valve seat in said casing in the fluid path between said inlet and said outlet; a movable valve member; second resilient means urging said valve member to normally engage said safety valve seat to close said safety valve seat; an operating element between said knob means and said movable valve member to move it from its seat on inward movement of said knob means; means acting between said casing and said knob means and preventing inward movement of said knob means when said knob means is in said third position.

2. In a control of the character described, a casing having a gas inlet, a main gas outlet and a pilot gas outlet; a valve structure controlling gas flow from said inlet to said outlets; and said valve structure including: a flat apertured valve seat in communication with said inlet; a flat rotatable valve element on said seat and incorporating means, in a first position thereof, for preventing gas flow to said outlets and incorporating means, in a second position thereof, to communicate said inlet to said pilot gas outlet and incorporating means, in a third position thereof, to communicate said inlet to said main gas outlet; knob means mounted on said casing for both rotatable and axial movement thereon; first resilient means acting between said valve element and said knob means to normally urge said knob means outwardly of said casing and to urge said valve element against said seat; an operating connection between said knob means and said flat valve element for rotating the same, said valve element having a series of spaced radial grooved portions which successively intercommunicate two openings in said flat valve seat in said second position; an electromagnetically maintainable safety valve comprising: an electromagnetic structure mounted on said casing; a safety valve seat in said casing; a movable valve member; second resilient means urging said valve member to normally engage said safety valve seat to close said safety valve; and an operating element between said knob means and said movable valve member to move it from its seat on inward movement of said knob means.

3. In a control of the character described, a casing having a gas inlet, a main gas outlet and a pilot gas outlet; a valve structure controlling gas flow from said inlet to said outlets; said valve structure including: a flat apertured valve seat in communication with said inlet; a flat rotatable valve element on said seat and incorporating means, in a first position thereof, for preventing gas flow to said outlets and incorporating means, in a second position thereof, to communicate said inlet to said pilot gas outlet and incorporating means, in a third position thereof, to communicate said inlet to said main gas outlet; knob means mounted on said casing for both rotatable and axial movement thereon, first resilient means acting between said valve element and said knob means to normally urge said valve element against said seat; an operating connection between said knob means and said flat valve element for rotating the same; an electromagnetically maintainable safety valve in the fluid flow path between said inlet and said outlets comprising: an electromagnetic structure mounted on said casing; a safety valve seat in said casing; a movable valve member; second resilient means urging said valve member to normally engage said safety valve seat to close said safety valve; an operating element between said knob means and said movable valve member to move it from its seat upon inward movement of said knob means; said casing including two separable sections with said flat valve seat being coplanar with the outer surface of one of said casing sections; said one casing section having a second valve seat coplanar with said first valve seat; a diaphragm valve member cooperating with said second seat for controlling flow between said valve structure and main outlet and having one side communicating with said flow path at the outlet side of said valve structure and having the other side thereof, defining one wall of an expansible chamber in the other of said casing sections; and means for alternately intercommunicating said chamber with the fluid flow path at the outlet side of said valve structure or for venting said chamber.

4. A control as set forth in claim 3 in which said diaphragm is integrally formed with a gasket member positioned between said casing sections.

5. A control as set forth in claim 4 in which said other casing section has a pilot gas adjustment valve located in a flow path extending between said inlet and said pilot gas outlet, and said one and said other casing sections have adjacent cavity portions in adjacent ends thereof, said cavity portions being intercommunicated by apertured portions of said gasket member.

6. A control as set forth in claim 5 including gas pressure regulator means in a path between said valve structure and said one side of said diaphragm, and means for adjustment of said pressure regulator means extending from said one casing section through said gasket member and into said other casing section.

7. A control as set forth in claim 6 in which said regulator means includes a second diaphragm, a third casing section, said second diaphragm being integrally formed with a second gasket which is between said one and said third casing sections, said second diaphragm defining one wall of a chamber in said third casing section, a vent outlet on said one casing section, said third casing section having a cavity portion at one end thereof which is in communication with the last mentioned chamber and also in communication with said vent outlet through an apertured portion of said second gasket.

8. A control as set forth in claim 7 in which said one casing section has three cavity portions each adjacent to a common cavity portion which is in communication with said other side of the first mentioned diaphragm, one of said three cavity portions being in communication with said pilot gas outlet, a second of said three cavities being in communication with said vent outlet and the third of said three cavities being in communication with said main gas outlet, and said first gasket being apertured to communicate said common cavity portion to one of said three cavity portions.

9. A control as set forth in claim 8 in which said third casing section has an elongated cavity portion having one end thereof in communication with said pilot gas outlet and the other one of its ends in communication with the upstream side of said pilot gas adjustment valve through an apertured portion of said second gasket.

10. In a control of the character described, a casing having a gas inlet, a main gas outlet and a pilot gas outlet; a valve structure controlling gas flow from said inlet to said outlets; said valve structure including: a flat apertured valve seat in communication with said inlet; a flat rotatable valve element on said seat and incorporating means, in a first position thereof, for preventing gas flow to said outlets and incorporating means, in a second position thereof, to communicate said inlet to said pilot gas outlet and incorporating means, in a third position thereof, to communicate said inlet to said main gas outlet; knob means mounted on said casing for both rotatable and axial movement thereon, first resilient means acting between said valve element and said knob means to normally urge said valve element against said seat; an operating connection between said knob means and said flat valve element for rotating the same; an electromagnetically maintainable safety valve in the fluid flow path between said inlet and said outlets comprising: an electromagnetic structure mounted on said casing; a safety valve seat in said casing; a movable valve member; second resilient means urging said valve member to normally engage said safety valve seat to close said safety valve; an operating element between said knob means and said movable valve member to move it from its seat upon inward movement of said knob means; said casing including two separable sections with said flat valve seat being coplanar with the outer surface of one of said casing sections; electrical terminal means on the other of said sections; and a releasable electrical connection from said terminal means to said electromagnetic structure.

11. In a control of the character described, a casing having a gas inlet, a main gas outlet, a pilot gas outlet, and means defining a flow path from said inlet to said outlets; a manually operated valve for controlling gas flow through said flow path including a flat apertured valve seat and a flat rotatable valve element on said seat; said valve seat and said valve element incorporating means for selectively preventing gas flow to said outlets, permitting gas flow to said pilot gas outlet, and permitting gas flow to said main gas outlet; manually operated means for positioning said valve element; an electromagnetically operated safety valve in said casing for controlling fluid flow through said flow path and including means interconnecting said manually operated means and said safety valve for permitting said safety valve to be opened by said manually operated means; a regulator valve in said casing for controlling fluid pressure in said flow path and including a diaphragm having one side in communication with said flow path; an externally controlled main shut-off valve in said casing for controlling fluid flow through said flow path and including a second diaphragm having one side in communication with fluid in said flow path, said main shut-off valve further including a flat valve seat coplanar with the valve seat of said manually operated valve, said second diaphragm cooperating with the valve seat of said main shut-off valve to control fluid flow therethrough; said casing being formed of first, second and third separable sections, the valve seats of said manually operated valve and said main shut-off valve being coplanar with the outer surface of said first casing section; and a first gasket being formed integral with one of said diaphragms and extending between said first and second casing sections.

12. The control of claim 11 including a second gasket formed integral with the other of said diaphragms and extending between said second and third casing sections.

References Cited

UNITED STATES PATENTS

| | | | |
|---|---|---|---|
| 2,675,965 | 4/1954 | Schell | 236—80 X |
| 2,957,518 | 10/1960 | Ray | 137—66 X |
| 3,150,712 | 9/1964 | Baatrup | 137—65 X |
| 3,236,252 | 2/1966 | Allingham | 137—66 |

FOREIGN PATENTS 528,346  10/1954  Belgium.

WILLIAM F. O'DEA, *Primary Examiner.*

RICHARD GERARD, *Assistant Examiner.*

U.S. Cl. X.R.

137—269, 505.41, 625.12; 236—80, 92; 251—185, 304, 367; 431—53